C. R. Bushnell,
Saw-Mill Head-Block.
N°83,830.    Patented Nov. 10, 1868.

Witnesses:
H. C. Ashkettle
Wm A. Morgan

Inventor:
C. R. Bushnell
per Munn & Co
Attorneys.

C. R. BUSHNELL, OF ST. ANTHONY'S FALLS, MINNESOTA.

Letters Patent No. 83,830, dated November 10, 1868.

---

IMPROVEMENT IN HEAD-BLOCKS.

---

The Schedule referred to in these Letters Patent and making part of the same.

---

*To all whom it may concern:*

Be it known that I, C. R. BUSHNELL, of St. Anthony's Falls, in the county of Hennepin, and State of Minnesota, have invented a new and useful Improvement in Head-Blocks for saw-mills; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
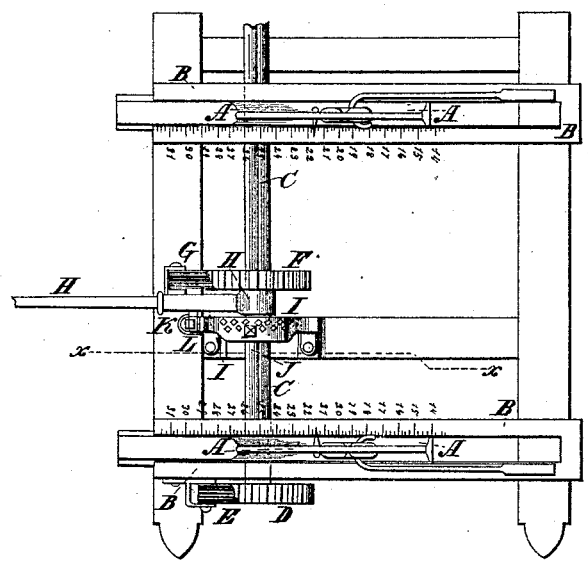
Figure 1 is a top view of a part of a saw-mill, illustrating my improvement.
Figure 2:
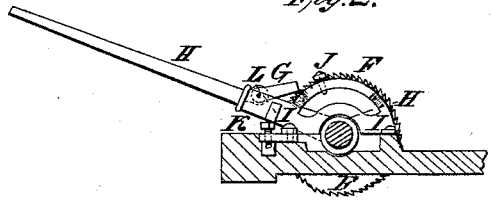
Figure 2 is a detail sectional view of the same, taken through the line x x, fig. 1.
Figure 3:
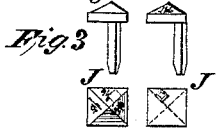
Figure 3 are detail views of the setting-pin, showing it in different positions.

My invention has for its object to improve the construction of the apparatus for operating the head-blocks of saw-mills, so as to enable them to be conveniently and quickly adjusted, to make the sawn lumber of any desired thickness, whether the saw be thick or thin; and it consists in the construction and combination of various parts, as hereinafter more fully described.

A are the head-blocks, which move back and forth in slots in the bars B, and upon the under sides of the horizontal parts of which are formed teeth, into which mesh the teeth of gear-wheels, attached to the shaft C, so that, by revolving the said shaft C back and forth, the said head-blocks A may be moved back and forth.

To one end of the shaft C is attached a ratchet-wheel, D, upon the teeth of which rests the series of pawls E, each of which being a little shorter than the adjacent one, so that however little the shaft C may be revolved, one or the other of the said pawls may take hold of one of the teeth of the ratchet-wheel D, and hold the head-blocks exactly in the place to which they have been moved.

F is a ratchet-wheel, attached to the middle part of the shaft C, upon the teeth of which rests the series of pawls G, each succeeding one of which is a little shorter than its preceding one, and which is pivoted to the side of the lever H.

Upon the lower end of the lever H is formed or to it is attached a sleeve, through which the shaft C passes, so as to pivot the lower end of the said lever to the said shaft.

I is an arch or semicircle, the ends of which rest upon and are secured to the frame of the carriage, by screws passing through ears formed upon the said semicircle I. The semicircle I has two rows of square holes formed in it, the holes of each row being half an inch apart, and the holes of the two rows alternating with each other, so that the horizontal distance between the holes may be one-quarter of an inch.

J is a square pin, fitting into the holes of the semicircle I.

The head of the pin is square, and in the shape of a low rectangular pyramid, and is attached diagonally to the body of the pin, in such a position that one side of said head may be flush with one corner of the said body of the pin, and each succeeding side of said head may project beyond the corresponding corner of said body one-sixteenth of an inch more than the preceding side.

K is a set-screw, passing through an eye attached to the end of the semicircle I.

L is a projection formed upon or attached to the side of the lever H, into the space between the head of the pin J and the set-screw K, between which it moves along the surface of the semicircle I, when the lever H is operated to set the timber to be sawn up to the saw.

By this means, by adjusting the position of the pin J and set-screw K, the timber may be set up by a single movement of the lever H, so that the lumber may be sawn of any desired thickness, whatever may be the thickness of the saw.

I claim as new, and desire to secure by Letters Patent—

1. The graduated semicircle I, resting upon the carriage, and provided with two rows of square holes; the set-screw K, armed lever H, receding pawls G, ratchet-wheels F D, and shaft C, all arranged to operate in the described manner, for the purpose specified.

2. The graduated semicircle I, when provided with two rows of square holes and the set-screw K, as herein described, for the purpose specified.

C. R. BUSHNELL.

Witnesses:
N. H. HEMIUP,
JNO. S. FALL.